J. F. MILLIGAN.
COOKING UTENSIL.
APPLICATION FILED JAN. 21, 1908.
946,387.
Patented Jan. 11, 1910.
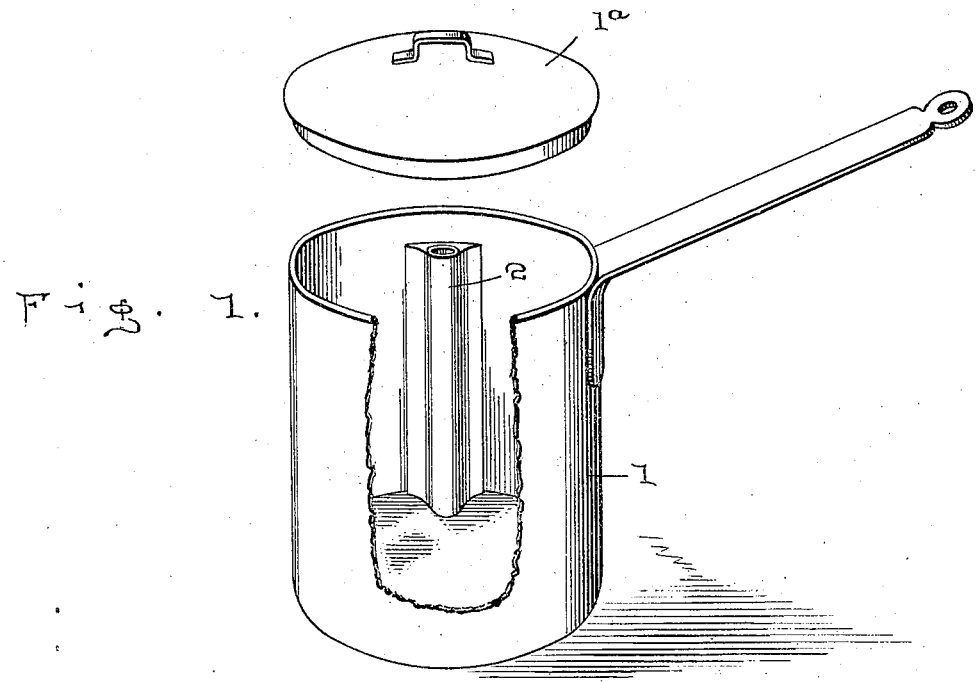
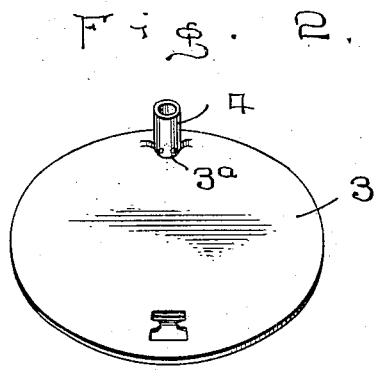
WITNESSES:
Thos. W. Riley
M. Newcomb.
INVENTOR
Joseph F. Milligan
BY W. J. FitzGerald & Co.,
Attorneys

UNITED STATES PATENT OFFICE.

JOSEPH F. MILLIGAN, OF CHEYENNE, WYOMING.

COOKING UTENSIL.

946,387.  Specification of Letters Patent.  Patented Jan. 11, 1910.

Application filed January 21, 1908. Serial No. 411,943.

*To all whom it may concern:*

Be it known that I, JOSEPH F. MILLIGAN, a citizen of the United States, residing at Cheyenne, in the county of Laramie and State of Wyoming, have invented a new and useful Improvement in Cooking Utensils, of which the following is a specification, reference being had to the accompanying drawings and to the reference characters thereon.

My invention relates to improvements in cooking utensils, as pots, boilers, kettles and pans.

It has for its object principally to suppress or eliminate all odors arising from the contents of such utensils during culinary operation; also to carry out such object in a simple, economic and effective manner.

Said invention consists of the combination and arrangement of certain instrumentalities or features, substantially as hereinafter fully disclosed and defined by the claim.

In the drawings: Figure 1 is a broken perspective view of a culinary vessel of the saucepan type, with its cover removed a short distance therefrom. Fig. 2 is a perspective view of a stove-lid having an adjunctive coöperating part with the odor conveying or venting tube of said vessel or saucepan.

In practicing my invention I provide a culinary or cooking vessel 1 provided with a suitable closure 1ª, which vessel may be a saucepan, boiler, pot or pan, with a tube or passage 2 suitably applied and secured to its inner surface and adapted to receive and conduct away the odors arising therein from its contents during, as previously stated the culinary or cooking operation. Said tube or passage has its upper end arranged to occupy a position near the top edge of the culinary or cooking vessel, so as to be above the contents of the latter and receive thereinto the odors therefrom, as aforesaid while the lower end of said tube opens through the vessel-bottom. The odors thus received by the tube or passage 2 are finally delivered therethrough directly into the combustion-chamber of the stove, whence they are conducted away by the draft into the chimney or smoke flue, and thus prevented from entering the room or taken out of the range of the smell, as will be appreciated.

In supporting or disposing the culinary vessel upon the stove-lid 3, instead of removing the same and setting the vessel into the stove-lid opening, I provide the stove-lid itself with an opening 3ª, at a suitable point, of course near its perimeter or edge, and arrange around said opening an upstanding short tube 4 adapted to be received by the tube or passage 2, within its lower end as the vessel is thus disposed in position. The latter arrangement provides against the escape of the odors and effects connection between the venting tube or passage 2 and the combustion-chamber of the stove when it is desired to expose the vessel to the action of the heat of the stove only and not to the direct action of the fire, as is usual in culinary or cooking operations.

This contrivance is simple, effective in use, readily applied, and therefore capable of manufacture at the minimum cost.

I claim:

A cooking utensil of the character described, comprising an odor venting tube applied to the inner surface thereof, with its upper end terminating a short distance below the upper edge of the device and its lower end extending through the bottom thereof, and a stove lid having an opening therein communicating with the combustion chamber, said stove lid having a tube applied to its upper surface around said opening and received within the lower end of the first referred to tube, said lid having the cooking utensil supported directly thereon.

JOSEPH F. MILLIGAN.

Witnesses:
 JOHN L. JOHNSTON,
 M. A. PIAGMAN.